United States Patent
Clint et al.

(10) Patent No.: US 6,983,669 B2
(45) Date of Patent: Jan. 10, 2006

(54) BALL SCREW MECHANISM WITH INTEGRAL OPPOSING THREAD

(75) Inventors: Patrick Clint, Minneapolis, MN (US); Bryce J. Bulthaus, Rockford, IL (US); Steven Caronna, Rockford, IL (US)

(73) Assignee: Atwood Mobile Products, Inc., Elkhart, IN (US)

( * ) Notice: Subject to any disclaimer, the term of this patent is extended or adjusted under 35 U.S.C. 154(b) by 0 days.

(21) Appl. No.: 10/269,109

(22) Filed: Oct. 10, 2002

(65) Prior Publication Data

US 2004/0069081 A1 Apr. 15, 2004

(51) Int. Cl.
 *F16H 55/00* (2006.01)

(52) U.S. Cl. .................. 74/424.75; 74/424.81; 74/424.82; 74/89.4

(58) Field of Classification Search ............... 74/89.23, 74/89.4, 89.42, 424.7, 424, 424.82, 441
See application file for complete search history.

(56) References Cited

U.S. PATENT DOCUMENTS

| | | | | |
|---|---|---|---|---|
| 3,244,022 A | * | 4/1966 | Wysong, Jr. | 74/424.75 |
| 3,304,794 A | * | 2/1967 | Bird | 74/409 |
| 3,643,521 A | * | 2/1972 | Nilsson | 74/89.4 |
| 5,178,029 A | * | 1/1993 | Klinkenberg | 74/89.4 |
| 5,555,771 A | * | 9/1996 | Kuroiwa et al. | 74/89.4 |

* cited by examiner

*Primary Examiner*—Thomas R. Hannon
*Assistant Examiner*—Timothy McAnulty
(74) *Attorney, Agent, or Firm*—John R. Benefiel; Dean Watson; Dura Automotive

(57) ABSTRACT

A ball screw mechanism has an opposing thread provided by an integral male thread formed at one end of a nut received on the screw. The male thread is of a smaller form than the female thread on the screw so as to not normally be in contact therewith, but should ay loss of the balls occur with the resultant slight relative axial shift of the screw and nut, the male threads engage to limit such relative axial movement to protect connected equipment. Both the nut male and female threads may be machined from a cylindrical nut blank.

6 Claims, 2 Drawing Sheets

BALL SCREW MECHANISM WITH INTEGRAL OPPOSING THREAD

BACKGROUND OF THE INVENTION

This invention concerns ball screw mechanisms of the well known type using a series of bearing balls interposed between aligned female thread forms in screw and nut members. The rolling ball interengagement greatly reduces the friction when the nut or screw is driven such that these devices are quite efficient and in widespread use in a variety of applications.

In U.S. Pat. No. 5,295,406 there is described a helical spring element inserted at one end of the nut beyond the point where the balls are present, occupying additional female thread turns. The presence of the helical spring element prevents relative axial movement between the screw and nut even if the balls are lost.

However, it is a cost disadvantage to assemble an additional component into the screw and nut threads. The spring element also may possibly engage the threads to create a frictional drag if close tolerances are not held, which would lessen the efficiency of the ball screw unit.

U.S. Pat. Nos. 6,401,557 B1 and 2,447,439 also describe ball screw mechanisms incorporating a separate nut element having male threads in the nut to prevent thrust forces from being transmitted back to the driving mechanism or motor. However, the male threads also comprise a separate element which is assembled into the nut, and are also normally engaged to create a frictional drag.

It is the object of the present invention to provide a ball screw mechanism which has an opposing thread feature preventing substantial relative axial travel of the screw and nut but which does not require an additional component to be assembled into the mechanism nor introduces appreciable frictional drag during normal operation of the ball screw.

SUMMARY OF THE INVENTION

The above object and others which will become apparent upon a reading of the following specification and claims are achieved by machining male threads into an extension section of the nut adjacent the main section formed with the female threads and axially offset therefrom. The male threads are undersize and normally centered in the screw female threads so as to normally be free from any contact with female threads to avoid the introduction of any frictional drag therein.

If the balls are lost to allow relative axial movement between the nut and screw, the male threads immediately come into engagement with the female thread, preventing any additional uncontrolled relative axial movement. Continued operation of the ball screw is still possible to create continued controlled axial movement, although with substantial frictional drag being present.

DESCRIPTION OF THE DRAWING FIGURES

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
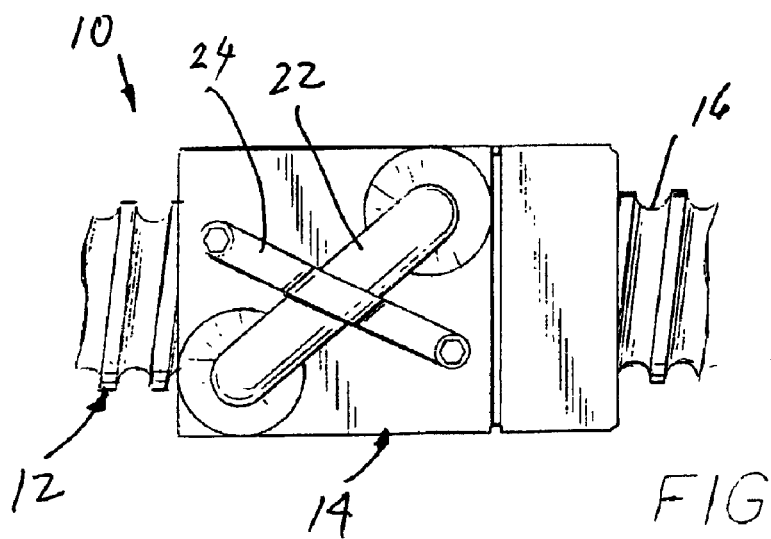
FIG. 1 is a fragmentary side view of a ball screw mechanism according to the invention
Figure 2:
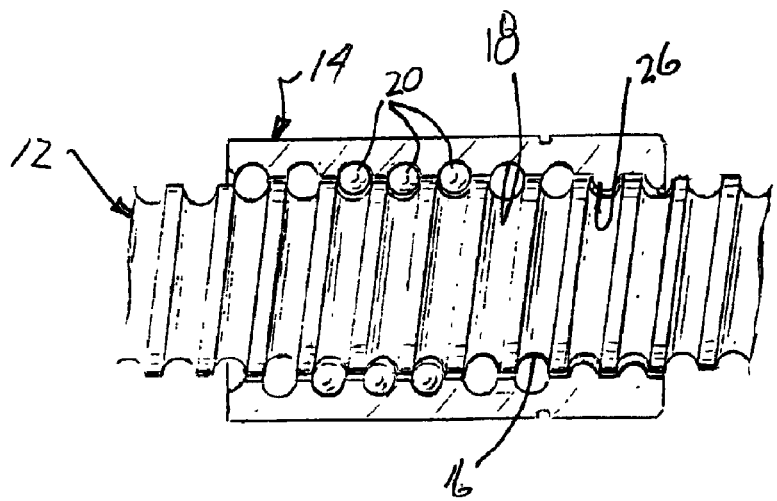
FIG. 2 is a partially sectional view of the ball screw shown in FIG. 1.

Referring to the drawings, FIG. 1 depicts the exterior of a ball screw unit 10, including an elongated screw 12 which is received in a nut 14. Both the screw 12 and nut 14 are formed with respective helical grooves defining a thread 16, 18 of a female Gothic form. The threads 16, 18 are complementary to each other to together form an arched flank opening according to the Gothic form, receiving a series of bearing balls 20 interposed between the helical grooves or thread turns 16, 18. The balls 20 contact the arched flanks of the threads 16, 18 and roll to one end of the nut 14 during continued relative rotation of the screw 12 in the nut 14, and are recirculated through a return tube 22 secured to the exterior of the nut 14 held with a bracket 24 affixed to the nut 14.

The ball return tube 22 is aligned with openings in the nut 14 through which the balls 20 enter and exit the nut 14 in recirculating along the thread 16, 18 in the well known manner. This is according to the conventional design known to those skilled in the art.

Figure 3:
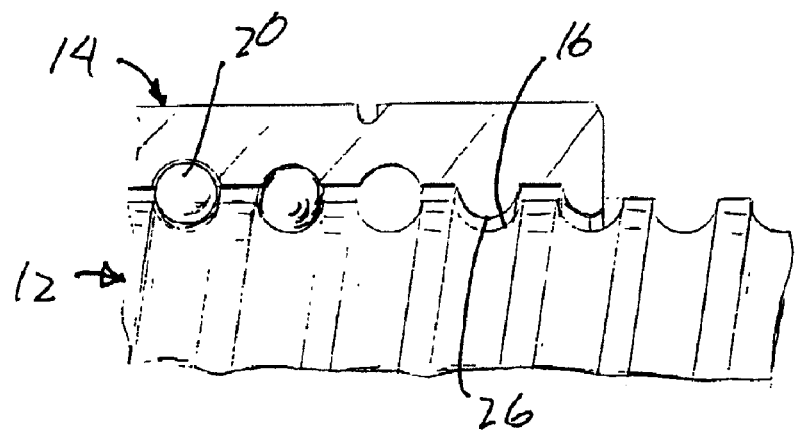
FIG. 3 is an enlarged fragmentary portion of the nut component included in the ball screw shown in FIGS. 1 and 2.

According to the present invention, a limited number of male threads 26 are also machined into the nut inside diameter in an axially aligned extension section thereof. The male thread 26 is of the same pitch, but smaller in form than the screw female thread 16. This is to insure that no contact normally exists between the male thread 26 and the screw female thread 16 as indicated in FIG. 3.

If the balls 20 are lost for any reason, the screw 12 will shift slightly axially with respect to the nut 14, bringing the male thread 26 into engagement with the flanks of the screw female thread 16, preventing any further uncontrolled relative axial movement, and thereby preventing any damage to equipment connected thereto.

Relative rotation between the nut 14 and screw 12 is still possible to allow controlled axial relative movement, albeit with much higher frictional drag, which increase in drag could be detected by a suitable sensor (not shown) to alert the operator and/or maintenance personnel to the condition of the ball screw.

Figure 4A:
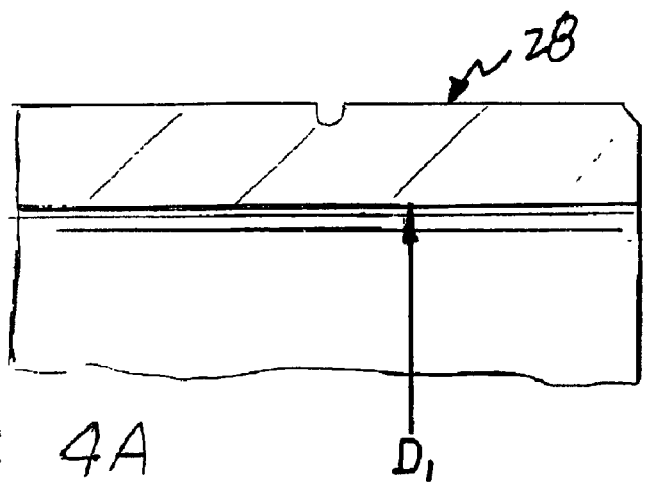
FIG. 4A is a fragmentary view of a section through a blank cylinder from which the nut according to the invention is machined.
Figure 4B:
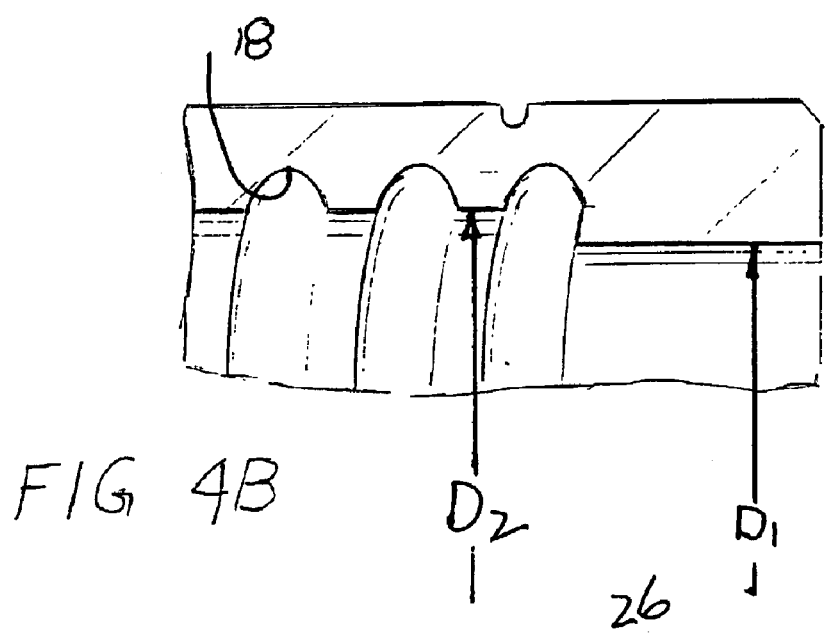
FIG. 4B is a sectional view of the blank shown in FIG. 4A with the female threads machined therein.
Figure 4C:
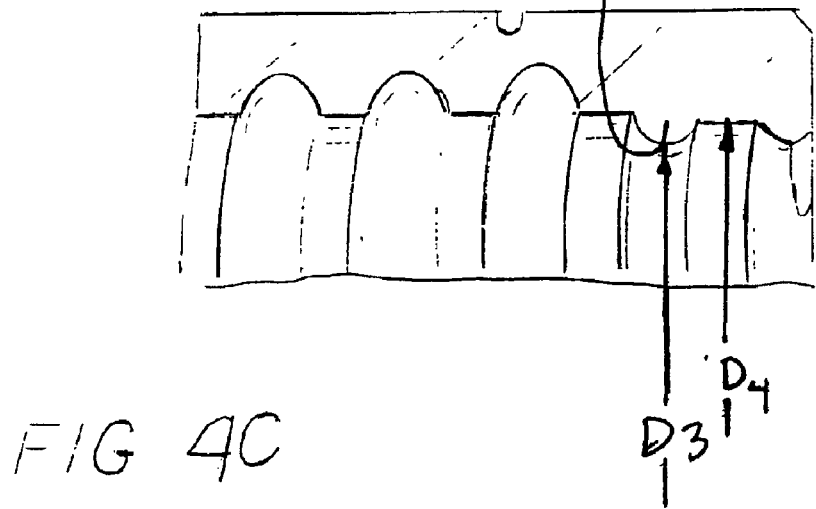
FIG. 4C is a fragmentary sectional view of the blank shown in FIG. 4B, with the male threads machined therein to complete the female and male thread forms.

FIGS. 4A–4C depict an example of how the nut 14 may be machined. The screw 12 may machined or otherwise formed in conventional fashion with the female thread 16.

In FIG. 4A, a blank is provided by a cylinder 28 having an inside diameter D1.

In FIG. 4B the female nut thread 18 is machined into the inside diameter D1 by a suitable thread turning tool (not shown), having a larger minor diameter D2 than the blank inside diameter.

In FIG. 4C, the male thread 26 is machined using a second turning tool (not shown), having a radius small enough so as to not contact the flanks of Gothic form of the screw female threads 16, a minor diameter D3 larger than the minor diameter of the screw thread 16 and a major diameter D4 larger than the major diameter of the screw thread 16 so that a clearance space normally exists between all points on the male thread 26 and the screw female thread 16.

Other machining methods and blank geometries are also possible.

This avoids the inducement of any frictional drag by the presence of the male threads 26 during normal operation. The nut male thread 26 thus acts as a secondary engagement feature without the need for a separately assembled element.

We claim:

1. A ball screw comprising:

an elongated screw formed with a female thread;

a nut formed with a complementary female thread;

a series of bearing balls interposed between said screw and nut and in rolling engagement therewith within said both of said female thread turns;

a ball return tube mounted to holes in said nut for receiving said balls after passing out of said holes in said nut which balls are recirculated back into said female thread;

said nut further formed with a male thread aligned with and fixed relative said female thread and located at one end of said nut, said male thread having the same lead as said screw female thread but of smaller form to thereby not be engaged therewith with said balls present in said female thread, whereby said male thread will only engage said female thread in said screw if said balls are absent to allow relative axial shifting of said screw and nut to bring said male thread into engagement with said screw female thread.

2. The ball screw according to claim 1 wherein said nut has an integral extension section thereon formed with said male thread.

3. A ball nut and screw assembly comprising, in combination:

a screw having an outer surface including a female thread;

a nut received on the screw, the nut formed with a female thread complementary to the female thread of the screw and having a pair of apertures at opposite ends of said female thread;

a plurality of balls disposed between the nut and the screw, each of the plurality of balls extending partially into the female thread of the screw and the female thread of the nut and in engagement therewith;

a ball return tube connected to the pair of apertures for receiving the balls which pass out one of said apertures and are thereby recirculated back into the other aperture;

the nut formed with an integral male thread aligned with and fixed relative to the said female thread of the nut adjacent one end of the nut, the male thread having the same lead as the female thread of the screw but smaller in form so as to be prevented from being engaged therewith by the engagement of the balls with the female threads, whereby said male thread in the nut engaging the female thread in the screw only after the balls are lost allowing relative axial movement of the screw and nut sufficient to engage said male thread with said screw female thread and thereby prevent any further uncontrolled relative screw and nut axial movement.

4. The ball nut and screw assembly according to claim 3 wherein the female threads are helical threads.

5. The ball nut and screw assembly according to claim 3 wherein the male thread are helical threads.

6. The ball nut and screw assembly according to claim 3 wherein male thread is of the same pitch as the female thread.

* * * * *